Nov. 22, 1938.    H. F. HERBIG    2,137,286
REFLECTOR
Filed May 26, 1936
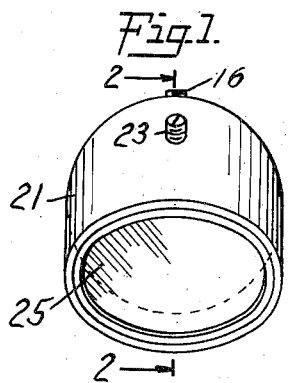
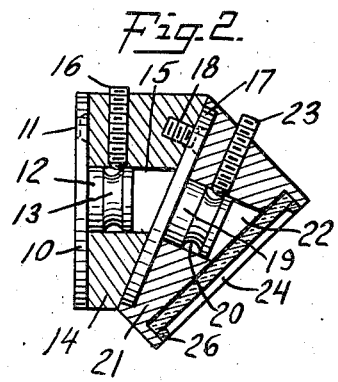
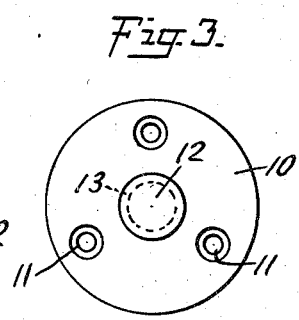
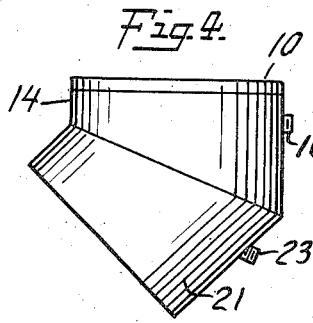
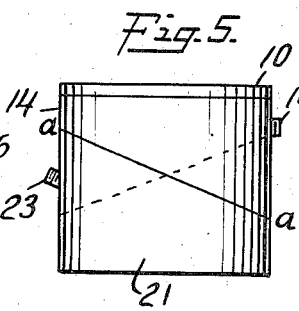
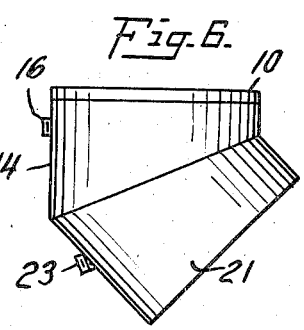
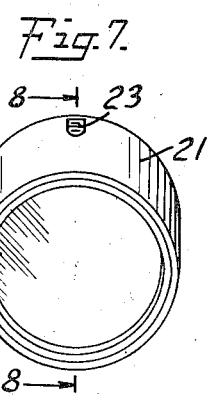
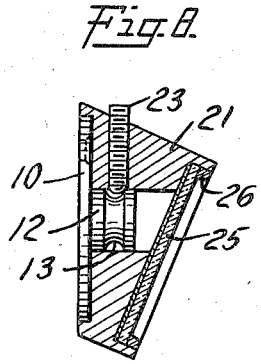
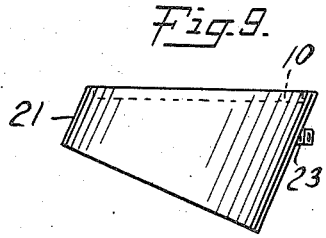
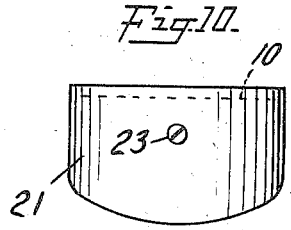
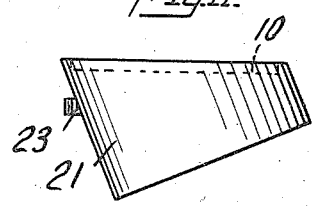
INVENTOR
Henry F. Herbig
BY
ATTORNEYS Patented Nov. 22, 1938

2,137,286

UNITED STATES PATENT OFFICE 2,137,286

REFLECTOR

Henry Frank Herbig, New York, N. Y., assignor to Signaphone Corporation of America, New York, N. Y., a corporation of Delaware Application May 26, 1936, Serial No. 81,821

7 Claims. (Cl. 88—97)

This invention relates to reflectors of the type which includes a reflecting element that may be moved into various positions with respect to a suppporting base. More particularly, the invention is concerned with a novel reflecting device of this type in which the reflecting element may be readily adjusted to the desired position on its base by a simple operation, and when in its adjusted position, may be securely fixed against displacement.

Adjustable reflectors are used for a variety of purposes in which it is desired to vary the angle of incidence or reflection of light by angular adjustment of the reflecting element. For example, reflectors of this type are commonly used in vehicles to indicate to the operator the presence of objects which are not directly in front of the vehicle, the reflector being secured on a part of the vehicle in front of the operator and adapted for angular adjustment to afford a view of objects in various directions. Another use to which reflectors of this type find application is in connection with mechanical observers, such as photoelectric cells. Certain installations of photoelectric cells require the use of reflectors mounted on a wall or other object and capable of accurate angular adjustment to reflect rays on the cell from a given source. For such purposes, it is desirable to employ a reflector in which the reflecting element may be readily and accurately adjusted with respect to its support and held securely in position against accidental displacement.

Various forms of adjustable reflectors have been employed heretofore for these and other purposes. In one form of reflector, the reflecting element is secured to its base by a ball and socket joint provided with friction means, such as a set screw, carried by the socket and adapted to engage the ball of the joint. Devices of this type are objectionable for the reason that the ball and socket joint supports the reflecting element at only one point so that the element is easily displaced when the reflector is accidently struck. In another form of reflector, a reflecting element is supported on a base by a universal joint, and the device is provided with three or more set screws spaced around the joint with one end of each screw threaded into the base and the other end in engagement with the reflecting element. The reflecting element is held in the desired position against displacement by the several set screws, but in order to vary its position it is necessary to adjust each of the screws individually, which requires considerable time and effort. Moreover, in the latter form of device, the set screws, being disposed under the edges of the reflecting element, limit the extent to which the element may be adjusted angularly and also present an unsightly appearance.

The present invention is directed to the provision of a reflecting device in which the reflecting element may be readily adjusted relative to its support to any desired angle within a wide range and may be securely locked in position by a simple operation. The new reflector is of simple construction and attractive appearance.

According to the present invention, the reflecting device includes a base adapted for connection to a wall or other support and having a bearing surface on which is seated an adjustment member mounted for rotation on the base. The top of the adjustment member is cut to provide a bearing surface inclined at an angle to the base, and seated on the inclined surface of the base, and seated on the inclined surface of the base is the base of a second adjustment member adapted for rotation about an axis at an angle to the axis of the first member. A reflecting element is suitably fixed on the upper end of the second member at an angle to the base thereof, and the two adjustment members are provided with means for locking the members against rotation.

With this construction, the reflecting element may be set at the desired angle relative to the base by relative rotation of the two adjustment members, and the element may be made to face in any radial direction with respect to the base by rotating the two members as a unit thereon. Accordingly, the two adjustment members permit universal setting of the reflecting element within a range determined by the maximum angle at which the reflecting element may be inclined to the base, that is, by the sum of the angle of inclination of the reflecting element with respect to the base of the upper member and the angle of inclination of the latter with respect to the base of the lower member.

It will be apparent that the new device does not require the use of set screws or the like to adjust the position of the reflecting element, the adjustment being accomplished by rotating the adjustment members relative to each other and the base. Preferably, the two adjustment members are of similar form and size and are made of cylindrical section to lend a smooth and attractive appearance to the device. The bearsurfaces for the adjustment members are preferably flat and of sufficient area to engage substantially the entire area of the bases of the respective members, so that the members in their adjusted positions are firmly seated against displacement. Also, if desired the adjustment members may be constructed so that the upper member carrying the reflecting element may be substituted on the base for the lower one in certain cases where it is not necessary to have a universal adjustment, thereby dispensing entirely with the lower member.

For a more complete understanding of the invention, reference may be had to the accompanying drawing, in which:

Fig. 1 is an end view of one form of the new device set for maximum angular displacement of the reflecting element;

Fig. 2 is a section on the line 2—2 of Fig. 1;

Fig. 3 is a plan view of the base for supporting the adjustment members;

Figs. 4, 5 and 6 are side views of the device shown in Fig. 1 in different positions of adjustment;

Fig. 7 is an end view of a modified form of the device in which the adjustment member carrying the reflecting element is mounted directly on the base;

Fig. 8 is a section on the line 8—8 of Fig. 7; and

Figs. 9, 10 and 11 are side views of the device shown in Fig. 7 in different positions of adjustment.

In the drawing, the device shown in Figs. 1 and 2 comprises a base 10 which is preferably in the form of a metal disc. The base is provided with a plurality of spaced openings 11 which are countersunk on the inner face of the base to receive the heads of screws or bolts (not shown) extending through the openings for securing the base to a wall or other object. Centrally disposed on the outer face of the base is a cylindrical pedestal 12 formed with a circumferential groove 13 having a rounded bottom.

Seated on the base 10 is an adjustment member 14 which is preferably made of "Bakelite" or similar material and has a cylindrical section of substantially the same diameter as the base. The adjustment member is formed with a central bore 15 into which the pedestal 12 of the base extends, the pedestal serving as an axis about which the member 14 may rotate. A set screw 16 is threaded through the side wall of the adjustment member in position to engage in the groove 13 of the pedestal slightly above the central part of the groove, that is, on the upper side thereof. Tightening the set screw not only holds the member against rotation on the base but also affords a cam action which holds the member firmly against the flat bearing surface of the base. The top of the cylindrical adjustment member 14 is substantially flat and is inclined at an angle to the base. Seated on the inclined top of the member and centrally disposed thereon is a base 17, similar in all respects to the base 10. The outer face of base 17 is countersunk to receive the heads of screws 18 which are threaded into member 14 to secure the base thereto. The base is also provided with a centrally disposed pedestal 19 similar to the pedestal 12 and formed with a circumferential groove 20.

A second cylindrical member 21 which is preferably made of the same material as the member 14, is mounted on the base 17 and has a central bore 22 perpendicular to base 17. The pedestal 19 fits tightly into the bore and serves as an axis about which the cylindrical member 21 may rotate. The inner end of cylindrical member 21 is inclined at an angle to the normal plane of its axis, preferably at the same angle at which the base 17 is inclined to base 10, and is centrally recessed to receive the base 17, as shown particularly in Fig. 1. A set screw 23 is threaded through the wall of member 21 and is adapted to engage in groove 20 slightly above the central part of the groove to seat the member firmly against the base 17 and hold the member against rotation thereon.

The outer end of cylindrical member 21 is formed with a recess 24 for receiving a circular mirror 25. Preferably, the diameter of the mirror is substantially the same as or slightly greater than that of recess 24, and the mirror is forced into the recess under pressure, whereby it is firmly secured therein against displacement. An annular ring 26 is also forced into the recess to overlie the edge of the mirror and insure against accidental removal of the mirror.

In the use of the device shown in Figs. 1 and 2, the base 10 is secured to the wall or other object by means of screws extending through the openings 11. The adjustment member 14 and the member 21 carrying the mirror are then mounted on the bases 10 and 17, respectively, as shown. The angle of inclination of the mirror with respect to base 10 may be adjusted by merely rotating the member 21 on adjustment member 14, and the radial position of the mirror with respect to the base 10 may be adjusted by rotating adjustment member 14. If desired, the members 14 and 21 may be provided with lateral openings (not shown) to receive the fingers of a spanner wrench for rotating the members to their desired positions. When the mirror is set in the desired position, the screws 16 and 23 may be tightened to engage the corresponding grooves of pedestals 12 and 19, respectively, to prevent rotation of the members. The cam action between the ends of the screws and the curved bottoms of the grooves serves to force the members against their respective bases. The flat surfaces of bases 10 and 17 provide relatively large bearing surfaces for the members 14 and 21, respectively, and hold the mirror firmly against displacement when the set screws 16 and 23 are tightened.

The angles at which the top of adjustment member 14 is inclined to base 10 and to the mirror 25, respectively, may be of various values depending on the range of adjustment which is desired. In the drawing, I have shown the angles as being approximately 22½° in both cases, and I provide these angles by making the rotatable members 14 and 21 from a single cylinder which is cut in a plane a—a, as shown in Fig. 5, at an angle of 22½° to the normal plane of the cylinder axis. The base 10 and mirror 25 are then mounted at the ends of the members 14 and 21, respectively, normal to the cylinder axis, and the two members are interconnected by base 17 secured on the inclined top of member 14 and engaging the inclined bottom of member 21. With this construction, the plane of the mirror may be set at a maximum angle of 45° with respect to the base 10, by adjusting member 21 so that the angle of inclination of the top of member 14 to its base 10 and the corresponding angle of the bottom of member 21 to the mirror 25, respectively, are additive. Accordingly, the plane of the mirror may be adjusted through a total angle of 90° relative to base 10 in any direction. This is shown clearly in Figs. 4 and 6, wherein the mirror is inclined at an angle of 45° to the base in one direction, in Fig. 4, and at an angle of 45° to the base in the opposite direction, in Fig. 6. It will be apparent that light directed on the mirror from a source in front of the mirror may be reflected in any direction within an angle of twice the permitted angular adjustment of the mirror, or 180°, which is sufficient for most purposes.

While I have illustrated the adjoining ends of adjustment numbers 14 and 21 as inclined at angles of approximately 22½° to the base 10 and mirror 25, respectively, it will be understood that these angles may be made greater or less to increase or limit the range of adjustment of the mirror. Also, the two angles need not be of the same value, but may be unequal if desired.

For some purposes, it is not necessary to provide for universal adjustment of the mirror and in this event the adjustment member 14 may be removed from its base 10 and the member 21 mounted thereon, as shown in Figs. 7 and 8. The substitution of one of the rotatable members 14, 21 for the other on base 10 is made possible by reason of the fact that the central bores 15 and 22, respectively, of the members are of the same size and the set screws 16 and 23 are in the same relative positions, and accordingly the pedestal 12 of base 10 occupies the same relative position in each member. As shown in Figs. 9, 10 and 11, the mirror 25 is inclined at a fixed angle of 22½° to the base 10 and the mirror may be made to face at this angle in any desired radial direction by rotating the cylindrical member 21 on the base. When the mirror has been set to face in the desired direction, the screw 23 is tightened to engage in groove 13 and hold the mirror against displacement.

It will be observed that the new reflector includes only a few simple parts which may be manufactured at low cost and which, when assembled, may be quickly and easily adjusted to hold the mirror securely in the desired position. The device is capable of adjustment over a wide range of positions, and presents an attractive appearance by reason of its inclusion of the cylindrical adjustment members.

While I have described and illustrated in detail only one form of the new reflector, it will be understood that the invention is not limited thereto but includes various other forms within its scope.

I claim:

1. A reflecting device comprising a base having a flat bearing surface of substantial area, a member mounted on the base for rotation about an axis normal to said bearing surface and having a flat surface engaging and substantially coextensive with said bearing surface, said member having a flat bearing surface inclined at an acute angle to said interengaging surfaces, a member mounted on said second bearing surface for rotation about an axis normal thereto and having a flat surface engaging and substantially coextensive with said second bearing surface, a reflecting element mounted on said second member and held in a plane at an acute angle to said second pair of interengaging surfaces, and means disposed substantially at the respective axes of rotation of said members for positively securing the first member against lateral movement on said first bearing surface and for positively securing the second member against lateral movement on said second bearing surface.

2. A reflecting device comprising a base having a flat bearing surface of substantial area, a member mounted on the base for rotation about an axis normal to said bearing surface and having a flat surface engaging and substantially coextensive with said bearing surface, said member having a flat bearing surface inclined at an acute angle to said interengaging surfaces, a member mounted on said second bearing surface for rotation about an axis normal thereto and having a flat surface engaging and substantially coextensive with said second bearing surface, a reflecting element mounted on said second member and held in a plane at an acute angle to said second pair of interengaging surfaces, means disposed substantially at the respective axes of rotation of said members for positively securing the first member against lateral movement on said first bearing surface and for positively securing the second member against lateral movement on said second bearing surface, and means cooperating with said last means for biasing the second member toward the first member and the first member toward the base.

3. A reflecting device comprising a base, a pedestal on said base, a member rotatably mounted on the base and having a bore for receiving said pedestal, a base secured to said member at an angle to said first base, a pedestal on said second base, a member rotatably mounted on said second base and having a bore for receiving the pedestal thereof, and a reflecting element carried by said second member at an angle to said second base.

4. A reflecting device comprising a base, a supporting member, means for removably mounting said member on the base for rotation thereon, a base similar to said first base secured to said member at an angle to the first base, a second supporting member, means similar to said first means for removably mounting said second member on said second base for rotation thereon, said members being interchangeable on said first base, and a reflecting element mounted on said second supporting member and inclined at an angle to said second base.

5. A reflecting device comprising a base, a pedestal on the base, a member mounted on the base having a bore for receiving the pedestal, said member being rotatable on the base, a set screw threaded in the member and adapted to engage the pedestal to prevent rotation of the member on the base, a base secured to said member at an angle to the first base, a pedestal thereon, a member mounted on said second base having a bore for receiving the pedestal thereof, the second member being rotatable on its base, a set screw carried by said member and adapted to engage the pedestal thereof to prevent rotation of the member, and a reflecting element mounted on the second member at an angle to said second base.

6. A reflecting device comprising a base, a pedestal on the base having a circumferential groove with an inclined upper side, a member mounted on the base for rotation and having a bore for receiving said pedestal, a base secured to said member at an angle to the first base, a pedestal on the second base having a circumferential groove with an inclined upper side, a member mounted on the second base for rotation and having a bore for receiving the pedestal thereof, a reflecting element mounted on the second member at an angle to the second base, and an adjustment screw in each of said members adapted to engage the pedestal of its corresponding base on the upper side of the groove thereof to bias the member toward its base and secure the member against rotation.

7. A reflecting device comprising a base having a bearing surface, a member disposed on the base with one end of the member seated on the bearing surface, the other end of the member being inclined at an angle to the base, one of said base and member having a cylindrical opening therein, a projecting element on the other of said base and member fitted closely in said opening, said member being rotatable on the projecting element as an axis, a second member disposed on the first member with the lower end thereof seated on the inclined end of the first member, the second member having the upper end thereof inclined at an angle to the lower end thereof, one of said first and second member having a cylindrical opening therein, a projecting element mounted on the other of said members closely fitted in the second opening, the second member being rotatable on said second element as an axis, the projecting elements being operable to positively secure said members against lateral movement, and a mirror mounted on the upper end of the second member.

HENRY FRANK HERBIG.